Nov. 8, 1932.  H. C. RICH ET AL  1,886,589
FILM PACK
Filed April 10, 1931
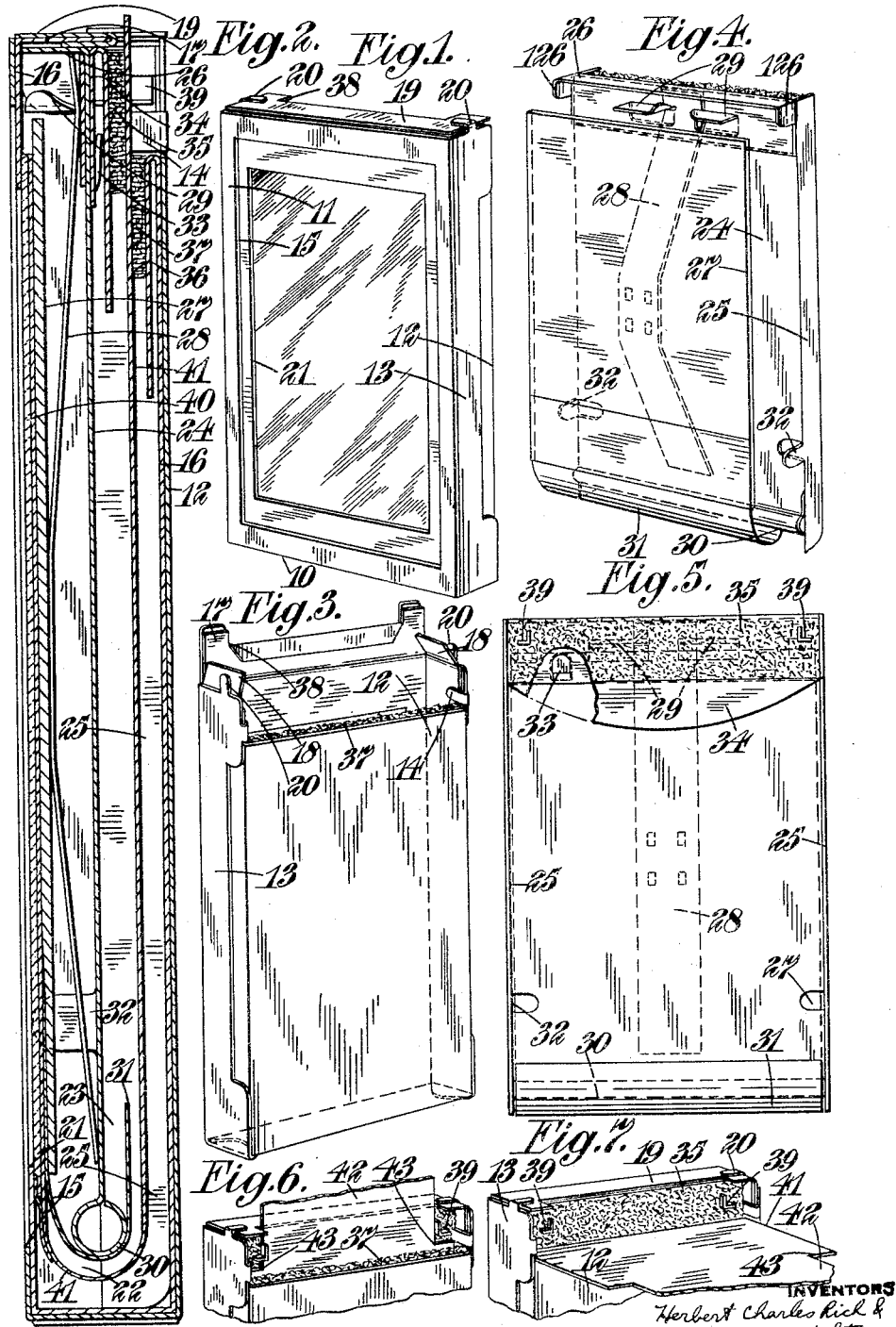
INVENTORS
Herbert Charles Rich &
Bertram Vincent Storr
by their attorneys
Byrnes, Stebbins, Parmelee & Blenko Patented Nov. 8, 1932

1,886,589

UNITED STATES PATENT OFFICE

HERBERT CHARLES RICH, OF BEDFORD, AND BERTRAM VINCENT STORR, OF ILFORD, ENGLAND, ASSIGNORS TO ILFORD LIMITED, OF ILFORD, ESSEX, ENGLAND, A BRITISH COMPANY

FILM PACK

Application filed April 10, 1931, Serial No. 529,082, and in Great Britain December 23, 1930.

This invention is for improvements in or relating to film packs of the type comprising a flat rectangular case to contain the films, and a partition dividing the case into a front or exposure compartment and a rear light-tight compartment. In film packs of this type the front wall of the case is provided with an aperture, hereinafter referred to as the window, through which the films in the front compartment may be exposed; and the individual films may be transferred in turn from the front to the rear compartment of the case round the lower end of the partition by means of draw-tabs attached to the films and projecting from a slot-like aperture in the rear compartment.

In known film packs, to withdraw the films from the pack after exposure it is usual to remove a cap or lid or some other part of the case. A film pack has also been proposed in which the film can be withdrawn by a pull in a plane substantially parallel to the plane of the film in the rear compartment of the pack and through an opening in the side edge of the pack produced by tearing a sealing strip or the like. One of the objects of the present invention is to provide a pack from which the exposed films can be withdrawn without removing or mutilating any part of the case, and without requiring any modification of the adapter in which the pack is held in the camera.

According to one feature of this invention, means is provided to permit of the complete withdrawal of a film through the aperture by a pull on its draw-tab in a direction inclined to the plane occupied by the film when in the rear compartment.

According to another feature of the invention the case may be formed of metal, and may be lined internally with a sheet of flexible material, such for example as black paper or cardboard, which is provided with a window registering with and of slightly smaller dimensions than the window in the front of the case. By this means it is possible to make the strips of metal bordering the window in the front of the case relatively narrow, the window in the lining strip of paper being the actual exposure aperture.

This construction has an advantage over the usual type of metal cased packs in which permanent distortion of the metal surrounds of the window can be accidentally produced with comparative ease. Such permanent distortion of the metal edge surrounding the window may seriously affect the smooth working of the pack, or may push the film out of the exposure plane, or allow light to leak in to the edges of the film. As the window is made in the card lining with only a narrow metal surround these disadvantages are largely overcome, due to the fact that as the card is a more resilient material it is not so liable to permanent accidental distortion as is metal.

The invention also includes the combination of a film pack case of this type, and as above specified, with a partition for dividing it into two compartments, the said partition comprising a metal plate having its sides flanged backwardly, one end flanged forwardly and the other end rolled to form a smooth guide over which the films pass when transferred from the front to the back compartments, and provided with lugs suitably disposed to maintain it in correct position in the assembled pack, in combination with a sheet of suitable material, for example black cardboard, resiliently attached to its front side and adapted to maintain the front film in close contact with the exposure window.

The rear top edge of this partition is provided with a layer of plush or the like engaging with the plush on the back of the case to form a light trapped aperture through which the draw-tabs pass. Suitable stops are also provided to prevent the films being drawn out too far when drawing them into the back compartment when in the adapter.

Preferably the sheet is attached to the partition by a bow-spring, attached to its centre, the said spring being provided at its upper end with notches engaging with projections pressed out from the metal plate which also act as stops to position the films in the front compartment of the pack.

According to a further feature of the invention the back wall of the pack case and its black lining may be foreshortened to a sufficient extent at the top end to allow a space between their top edges and the film stop lugs provided on the rear surface of the partition, through which space the films can be withdrawn from the pack by pulling the draw-tabs at an angle to the rear face of the case.

In a preferred form of the invention the front wall and the sides of the case are provided with hinged portions, adapted to fold over the upper end of the partition, and to be secured in position after insertion of the films by bending over lugs attached to the side walls of the case.

One construction of case for a film pack according to the present invention will now be described in detail by way of example with reference to the accompanying drawing in which:—

Figure 1 is a front perspective view of the case;

Figure 2 is a vertical section through the centre of the case, showing one film in position;

Figure 3 is a perspective view showing the back of the case with the top prised open;

Figure 4 is a front perspective view of the partition;

Figure 5 is a rear elevation of the partition;

Figure 6 is a perspective view illustrating the manner in which an exposed film is transferred to a rear compartment in the case, and Figure 7 is a perspective view illustrating the manner in which a film is withdrawn from the case.

Throughout this description like reference numerals indicate like parts.

The case 10 is formed from a single metal blank, which is bent into a substantially U-shaped form to provide a front wall 11, a rear wall 12, and side walls 13. The side walls 13 are formed by a double thickness of metal and are secured by bent-over lugs 14. The front 11 of the case is provided with a window 15. In its interior the case is lined with a lining 16 of thin black cardboard which is secured in position by the lugs 14 above-mentioned. The portions of the cardboard lining which line the front and sides of the case are extended slightly above the top of the case as at 17 and 18 to form flaps which are bent over to close the case. The flap 17 attached to the front portion of the lining has a stiffening strip of metal 19 attached thereto. Lugs 20 are formed on the side walls of the case and are adapted to be bent over to secure the stiffener 19 and the flaps in their closure positions, as shown in Figures 2, 6 and 7. It will be appreciated therefore that this case is not provided with the usual removable closure cap. The metal stiffener 19 is cut away as at 38 to provide a slot in the top of the case. The front portion of the lining is formed with a window 21 which registers with the window 15 formed in the front of the case but is of smaller dimensions. The black lining in the front thus forms in effect a mask in the window of the metal case. The case is divided by a metal partition into two compartments, a front compartment 22 for unexposed films and a rear compartment 23 for exposed films. This partition which is shown in Figures 2, 4 and 5 consists of a metal plate 24 having its two sides 25 flanged backwardly and its top 26 flanged forwardly. Portions at the sides of the top 26 are bent down as at 126. In front of the partition is a sheet of cardboard 27 to which a bow-spring 28 is attached at its centre. The upper end of the bow-spring is notched and the notches are engaged by two tabs 29 pressed out from the metal plate 24. These tabs 29 also serve as stops for the films in the front compartment 22. At its lower edge the plate 24 is rolled to a smooth rounded form as at 30 to facilitate the operation of drawing the exposed films from the front compartment 22 to the rear compartment 23. The cardboard sheet 27 has attached to it a strip of black paper 31 which is bent round the rolled edge 30 and upwards into the rear compartment.

The flanged sides 25 of the partition are continued down beyond the rolled edge 30 in order to position the partition in the case with a clearance space between this rolled edge and the bottom of the case. Two small lugs 32 are pressed out from the plate and serve to space it away from the front of the case. The plate is spaced away from the back of the case by the flanged sides 25. Attached to the top of the partition by lugs 33 is a U-shaped strip of black cardboard 34. The rear portion of this strip is provided with a layer of plush or the like 35.

It will be observed that the rear wall 12 of the case and its lining 16 do not continue the full height of the case. This rear lining is bent over as at 36 and is provided with a layer of plush 37 which co-operates with the plush 35 to form a light-tight closure for the rear compartment 23. Projecting through the plush 35 are two stops 39 (pressed out from the plate 24) the distance between which is slightly less than the width of the case and corresponds approximately to the width of the slot formed at 38.

In Figure 1 a film 40 is shown in the front compartment and this film is pressed forwardly into the exposure position by the cardboard sheet 27 and the bow-spring 28. To the lower edge of the film 40 a strip of paper 41 is attached. This paper is bent round the rolled edge 30 of the partition and extends up through the rear compartment and terminates in a tab 42 which projects vertically through the aperture formed at 38. The reduction in width between the strip 41 and the tab 42 provides two shoulders 43 which are arranged to engage the stops 39. This is clearly shown in Figure 6.

In order to transfer an exposed film from the front compartment 22 to the rear compartment 23, the operator takes hold of the draw-tab 42 and pulls it vertically thus drawing the film around the rolled edge 30 of the partition. The distance through which the draw-tab 42 may be pulled is limited by the shoulders 43 coming in contact with the stops 39. This operation may be effected while the case is in the usual adapter.

If, after a draw-tab has been pulled vertically to its fullest extent, it is desired to withdraw the film attached to it from the case, the case is removed from the adapter, and without displacing any portion of the case the draw-tab is pulled out horizontally as shown in Figure 7 so that the shoulders 43 clear the stops 39. The film may thus be completely withdrawn from the case.

We claim:—

1. The combination with a film pack of the kind comprising a flat rectangular case to contain a number of superposed films, each of which is attached to a draw tab, and a partition dividing the case into a front exposure compartment having a window through which the films may be exposed, and a rear light-tight compartment, and having in the rear compartment of the case a plush-lined aperture through which the draw tabs protrude, of means to prevent the withdrawal of a film through the aperture by a pull on its draw tab in one direction but to permit of the complete withdrawal of a film through the aperture by a pull on its draw tab in another direction, and an internal lining for the case comprising a sheet of flexible material which is provided with a window registering with and of slightly smaller dimensions than the window in the exposure compartment of the case.

2. The combination with a film pack of the kind comprising a flat rectangular case to contain a number of superposed films, each of which is attached to a draw tab, and a partition dividing the case into a front exposure compartment having a window through which the films may be exposed, and a rear light-tight compartment, and having in the rear compartment of the case a plush-lined aperture through which the draw tabs protrude, of means to prevent the withdrawal of a film through the aperture by a pull on its draw tab in one direction but to permit of the complete withdrawal of a film through the aperture by a pull on its draw tab in another direction, and an internal lining for the case comprising a sheet of black cardboard which is provided with a window registering with and of slightly smaller dimensions than the window in the exposure compartment of the case.

3. The combination with a film pack of the kind comprising a flat rectangular case to contain a number of superposed films, each of which is attached to a draw tab, and a partition dividing the case into a front exposure compartment having a window through which the films may be exposed and a rear light-tight compartment, and having in the rear compartment of the case a plush-lined aperture through which the draw tabs protrude, of at least one stop adapted to prevent the withdrawal of a film through the aperture by a pull on its draw tab in one direction but to permit of the complete withdrawal of a film through the aperture by a pull on its draw tab in another direction, and an internal lining for the case comprising a sheet of black cardboard which is provided with a window registering with and of slightly smaller dimensions than the window in the exposure compartment of the case.

4. The combination with a film pack of the kind comprising a flat rectangular case to contain a number of superposed films, each of which is attached to a draw tab, and a partition dividing the case into a front exposure compartment having a window through which the films may be exposed, and a rear light-tight compartment, and having in the rear compartment of the case a plush-lined aperture through which the draw tabs protrude, of means to prevent the withdrawal of a film through the aperture by a pull on its draw tab in one direction but to permit of the complete withdrawal of a film through the aperture by a pull on its draw tab in another direction, an internal lining for the case comprising a sheet of flexible material having a window registering with and of slightly smaller dimensions than the window in the exposure compartment of the case, and a layer of plush attached to that portion of the lining which is adjacent to the aperture aforesaid.

5. The combination with a film pack of the kind comprising a flat rectangular case to contain a number of superposed films, each of which is attached to a draw tab, and a partition, constituted by a metal plate associated with a sheet of black cardboard having at least one spring attached to it and arranged to locate it in position in front of the plate, dividing the case into a front exposure compartment and a rear light-tight compartment, and having in the rear compartment of the case a plush-lined aperture through which the draw tabs protrude, of at least one stop adapted to prevent the withdrawal of a film through the aperture by a pull on its draw tab in one direction but to permit of the complete withdrawal of a film through the aperture by a pull on its draw tab in another direction.

6. The combination with a film pack of the kind comprising a flat rectangular case to contain a number of superposed films, each of which is attached to a draw tab, and a partition, constituted by a metal plate associated with a sheet of black cardboard having a bow spring attached at its centre to said sheet and provided at its upper end with notches engaging with projections pressed out from the metal plate for the purpose of locating it in position in front of the plate, dividing the case into a front exposure compartment and a rear light-tight compartment, and having in the rear compartment of the case a plush-lined aperture through which the draw tabs protrude, of at least one stop adapted to prevent the withdrawal of a film through the aperture by a pull on its draw tab in one direction but to permit of the complete withdrawal of a film through the aperture by a pull on its draw tab in another direction.

7. The combination with a film pack of the kind comprising a flat rectangular case to contain a number of superposed films, each of which is attached to a draw tab, and a partition, constituted by a metal plate, provided with lugs to maintain it in a position spaced apart from the front wall of the case and associated with a sheet of black cardboard having at least one spring attached to it and arranged to locate it in position in front of the plate, dividing the case into a front exposure compartment and a rear light-tight compartment, and having in the rear compartment of the case a plush-lined aperture through which the draw tabs protrude, of at least one stop adapted to prevent the withdrawal of a film through the aperture by a pull on its draw tab in one direction but to permit of the complete withdrawal of a film through the aperture by a pull on its draw tab in another direction.

8. The combination with a film pack of the kind comprising a flat rectangular case to contain a number of superposed films, each of which is attached to a draw tab, and a partition dividing the case into a front exposure compartment and a rear light-tight compartment, and having in the rear compartment of the case a plush-lined aperture formed partly in the top of the case and partly in the back wall thereof through which the draw tabs protrude, of at least one stop adapted to prevent the withdrawal of a film through the aperture by a pull on its draw tab in one direction but to permit of the complete withdrawal of a film through the aperture by a pull on its draw tab in another direction.

9. The combination with a film pack of the kind comprising a flat rectangular case to contain a number of superposed films, each of which is attached to a draw tab, and a partition dividing the case into a front exposure compartment having a window through which the films may be exposed and a rear light-tight compartment, and having in the rear compartment of the case a plush-lined aperture formed partly in the top of the case and partly in the back wall thereof through which the draw tabs protrude, of at least one stop adapted to prevent the withdrawal of a film through the aperture by a pull on its draw tab in one direction but to permit of the complete withdrawal of a film through the aperture by a pull on its draw tab in another direction, and an internal lining for the case comprising a sheet of black cardboard which is provided with a window registering with and of slightly smaller dimensions than the window in the exposure compartment of the case.

10. A film pack comprising in combination a partition, a flat rectangular case to contain a number of superposed films, each of which is attached to a draw tab, said case being divided by said partition into a front exposure compartment having a window through which the films may be exposed and a rear light-tight compartment provided with a plush-lined aperture through which the draw tabs protrude, and a lining layer of flexible sheet material adapted to fit within the case and provided with a window registering with and of slightly smaller dimensions than the window in the exposure compartment of the case.

11. A film pack comprising in combination a partition, a flat rectangular case to contain a number of superposed films, each of which is attached to a draw tab, said case being divided by said partition into a front exposure compartment having a window through which the films may be exposed and a rear light-tight compartment provided with a plush-lined aperture through which the draw tabs protrude, and a lining layer of black cardboard adapted to fit within the case and provided with a window registering with and of slightly smaller dimensions than the window in the exposure compartment of the case.

12. A film pack comprising in combination a partition, a flat rectangular case to contain a number of superposed films, each of which is attached to a draw tab, said case having a rear wall which is foreshortened at its upper end and being divided by said partition into a front exposure compartment having a window through which the films may be exposed and a rear light-tight compartment provided with a plush-lined aperture through which the draw tabs protrude, lugs projecting from the rear surface of the partition and serving to limit the upward movement of the films in the rear compartment of the pack but to permit of the withdrawal of the films from the pack by a pull on the draw tabs at an angle to the rear wall of the case.

13. A film pack comprising in combination a partition, a flat rectangular case to contain a number of superposed films, each of which is attached to a draw tab, said case having a rear wall which is foreshortened at its upper end and being divided by said partition into a front exposure compartment having a window through which the films may be exposed and a rear light-tight compartment provided with a plush-lined aperture through which the draw tabs protrude, lugs projecting from the rear surface of the partition and serving to limit the upward movement of the films in the rear compartment of the pack but to permit of the withdrawal of the films from the pack by a pull of the draw tabs at an angle to the rear wall of the case, and a lining layer of flexible sheet material adapted to fit within the case and provided with a window registering with and of slightly smaller dimensions than the window in the exposure compartment of the case.

14. A film pack comprising in combination a partition, a flat rectangular case to contain a number of superposed films, each of which is attached to a draw tab, said case having a rear wall which is foreshortened at its upper end and being divided by said partition into a front exposure compartment having a window through which the films may be exposed and a rear light-tight compartment provided with a plush-lined aperture through which the draw tabs protrude, lugs projecting from the rear surface of the partition and serving to limit the upward movement of the films in the rear compartment of the pack but to permit of the withdrawal of the films from the pack by pulling the draw tabs at an angle to the rear wall of the case, and a lining layer of black cardboard adapted to fit within the case and provided with a window registering with and of slightly smaller dimensions than the window in the exposure compartment of the case.

15. A film pack comprising in combination a partition, a flat rectangular case to contain a number of superposed films, each of which is attached to a draw tab, the case being divided by said partition into a front exposure compartment having a window through which the films may be exposed and a rear light-tight compartment provided with a plush-lined aperture through which the draw tabs protrude, and the front and side walls of the case having hinged portions adapted to fold over the upper end of the partition, and a lining layer of flexible sheet material adapted to fit within the case and provided with a window registering with and of slightly smaller dimensions than the window in the exposure compartment of the case.

16. A film pack comprising in combination a partition constituted by a metal plate associated with a sheet of black cardboard having at least one spring attached to it and arranged to locate it in position in front of the plate, a flat rectangular case to contain a number of superposed films, each of which is attached to a draw tab, said case being divided by said partition into a front exposure compartment having a window through which the films may be exposed and a rear light-tight compartment provided with a plush-lined aperture through which the draw tabs protrude, lugs projecting from the rear surface of the partition and serving to limit the upward movement of the films in the rear compartment of the pack but to permit of the withdrawal of the films from the pack by a pull on the draw tabs at an angle to the rear wall of the case and a lining layer of flexible sheet material adapted to fit within the case and provided with a window registering with and of slightly smaller dimensions than the window in the exposure compartment of the case.

17. A film pack comprising in combination a partition, constituted by a metal plate, a sheet of black cardboard, and a bow-spring attached at its centre to said sheet and provided at its upper end with notches engaging with projections pressed out from the metal plate for the purpose of locating the sheet in position in front of the plate, a flat rectangular case to contain a number of superposed films, each of which is attached to a draw tab, said case being divided by said partition into a front exposure compartment having a window through which the films may be exposed and a rear light-tight compartment provided with a plush-lined aperture through which the draw tabs protrude, lugs projecting from the rear surface of the partition and serving to limit the upward movement of the films in the rear compartment of the pack but to permit of the withdrawal of the films from the pack by a pull on the draw tabs at an angle to the rear wall of the case, and a lining layer of flexible sheet material adapted to fit within the case and provided with a window registering with and of slightly smaller dimensions than the window in the exposure compartment of the case.

18. A film pack comprising in combination a partition constituted by a metal plate, a sheet of black cardboard and a bow-spring attached at its centre to said sheet and provided at its upper end with notches engaging with projections pressed out from the metal plate for the purpose of locating the sheet in position in front of the plate, a flat rectangular case to contain a number of superposed films, each of which is attached to a draw tab, the front and side walls of the case being provided with hinged portions adapted to fold over the upper end of the partition, and the case having a rear wall which is foreshortened at its upper end and being divided by said partition into a front exposure compartment having a window through which the films may be exposed and a rear light-tight compartment provided with a plush-lined aperture through which the draw tabs protrude, lugs projecting from the rear surface of the partition and serving to limit the upward movement of the films in the rear compartment of the pack but to permit of the withdrawal of the films from the pack by a pull on the draw tabs at an angle to the rear wall of the case, and a lining layer of flexible sheet material adapted to fit within the case and provided with a window registering with and of slightly smaller dimensions than the window in the exposure compartment of the case.

19. The combination with a film pack of the kind comprising a flat rectangular case to contain a number of superposed films, each of which is attached to a draw tab, a partition dividing the case into a front exposure compartment and a rear light-tight compartment, and having in the rear compartment of the case a plush-lined aperture through which the draw tabs protrude, and means to prevent the withdrawal of a film through the aperture by a pull on its draw lengthwise of the film, of means to permit of the complete withdrawal of a film through the aperture by a pull on its draw tab in a direction inclined to the plane occupied by the film when in said rear compartment.

20. The combination with a film pack of the kind comprising a flat rectangular case to contain a number of superposed films, each of which is attached to a draw tab, a partition dividing the case into a front exposure compartment and a rear light-tight compartment, and having in the rear compartment of the case a plush-lined aperture through which the draw tabs protrude, at least one stop adapted to prevent the withdrawal of a film through the aperture by a pull on its draw tab lengthwise of the film, of means to permit of the complete withdrawal of a film through the aperture by a pull on its draw tab in a direction inclined to the plane occupied by the film when in said rear compartment.

In testimony whereof we have signed our names to this specification.

HERBERT CHARLES RICH.
BERTRAM VINCENT STORR.